United States Patent
Duffy et al.

(10) Patent No.: US 6,599,946 B2
(45) Date of Patent: Jul. 29, 2003

(54) BLOWING AGENT COMPOSITION AND POLYMERIC FOAM CONTAINING A NORMALLY-LIQUID HYDROFLUROCARBON AND CARBON DIOXIDE

(75) Inventors: John D. Duffy, La Wantzenau (FR); Warren H. Griffin, Saginaw, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 10/286,565

(22) Filed: Nov. 1, 2002

(65) Prior Publication Data

US 2003/0119926 A1 Jun. 26, 2003

Related U.S. Application Data

(63) Continuation of application No. 09/997,744, filed on Nov. 29, 2001.
(60) Provisional application No. 60/257,482, filed on Dec. 21, 2000.

(51) Int. Cl.$^7$ .................................................. C08J 9/14
(52) U.S. Cl. ............................ 516/12; 516/18; 521/88; 521/97; 521/98
(58) Field of Search ........................... 521/88, 98, 97; 516/12, 18

(56) References Cited

U.S. PATENT DOCUMENTS

| | | | |
|---|---|---|---|
| 4,214,054 A | 7/1980 | Watanabe et al. |
| 4,217,319 A | 8/1980 | Komori |
| 4,323,528 A | 4/1982 | Collins |
| 4,663,360 A | 5/1987 | Park et al. |
| 4,681,715 A | 7/1987 | Park et al. |
| 5,155,141 A | 10/1992 | Deger et al. |
| 5,162,381 A | 11/1992 | Richard et al. |
| 5,182,308 A | 1/1993 | Voelker et al. |
| 5,266,605 A | * 11/1993 | Welsh |
| 5,278,196 A | 1/1994 | Robin et al. |
| 5,314,926 A | 5/1994 | Robin et al. |
| 5,334,337 A | 8/1994 | Voelker et al. |
| 5,405,883 A | 4/1995 | Park |
| 5,422,378 A | * 6/1995 | Vo |
| 5,445,757 A | 8/1995 | Pennetreau |
| 5,496,866 A | 3/1996 | Sommerfeld et al. |
| 5,496,867 A | 3/1996 | Sommerfeld et al. |
| 5,624,970 A | 4/1997 | Sommerfeld et al. |
| 5,646,196 A | 7/1997 | Sommerfeld et al. |
| 5,670,552 A | * 9/1997 | Gusavage et al. |
| 5,688,431 A | 11/1997 | Minor |
| 5,776,389 A | * 7/1998 | Chaudhary |
| 5,789,458 A | 8/1998 | Londrigan et al. |
| 5,837,743 A | 11/1998 | Londrigan et al. |
| 5,856,679 A | 1/1999 | Barthelemy et al. |
| 5,866,029 A | 2/1999 | Lund et al. |
| 5,877,226 A | 3/1999 | Tsuda et al. |
| 5,889,286 A | 3/1999 | Barthelemy et al. |
| 5,912,279 A | 6/1999 | Hammel et al. |
| 5,993,707 A | 11/1999 | Chaudhary et al. |
| 6,022,912 A | 2/2000 | Spitler et al. |
| 6,043,291 A | 3/2000 | Takeyaso et al. |
| 6,080,799 A | 6/2000 | Krueche et al. |
| 6,086,784 A | 7/2000 | Barthelemy et al. |
| 6,087,408 A | 7/2000 | Ide et al. |
| 6,123,881 A | 9/2000 | Miller et al. |
| 6,127,440 A | 10/2000 | Sanyasi |
| 6,166,109 A | 12/2000 | Spitler et al. |
| 6,187,831 B1 | 2/2001 | Miller et al. |
| 6,268,046 B1 | 7/2001 | Miller et al. |
| 6,274,640 B1 | 8/2001 | Miller et al. |

FOREIGN PATENT DOCUMENTS

| | | |
|---|---|---|
| DE | 44 39 082 A1 | 4/1997 |
| DE | 19600026 A | 7/1997 |
| DE | 198 22 944 A1 | 5/1998 |
| DE | 198 22 945 A1 | 11/1999 |
| EP | 0 557 533 A1 | 9/1993 |
| EP | 0 464 581 B1 | 2/1995 |
| EP | 0 842 972 A1 | 5/1998 |
| EP | 0 921 148 A1 | 6/1999 |
| EP | 0 922 554 A1 | 6/1999 |
| EP | 0 960 902 A1 | 12/1999 |
| EP | 1 095 969 A2 | 5/2001 |
| EP | 1 101 791 A1 | 5/2001 |
| JP | 10045935 A2 | 2/1998 |
| WO | WO 96/12758 | 5/1996 |
| WO | WO 96/14354 | 5/1996 |
| WO | WO 98/39378 | 9/1998 |
| WO | WO 98/56847 | 12/1998 |
| WO | WO 99/05204 | 2/1999 |
| WO | WO 99/36486 | 7/1999 |

* cited by examiner

*Primary Examiner*—Morton Foelak
(74) *Attorney, Agent, or Firm*—Steven W. Mork

(57) ABSTRACT

The present invention relates to blowing agent compositions for polymeric foams that contain carbon dioxide and a hydrofluorocarbon having a boiling point of 14° C. or higher and lower than about 120° C. The present invention also relates to processes for preparing polymeric foam using such blowing agent compositions, foamable polymer compositions containing such blowing agents, and polymeric foams containing such blowing agent compositions.

Suitable blowing agent combinations include: (a) a composition containing carbon dioxide and at least one hydrofluorocarbon having a boiling point of 30° C. to about 120° C. that is essentially free of other low boiling ethers and hydrocarbons; (b) a composition containing greater than 50 weight-percent carbon dioxide and at least one hydrofluorocarbon having a boiling point of 14° C. or higher to about 120° C.; and (c) carbon dioxide and one hydrofluorocarbon having a boiling point of 14° C. or higher and lower than about 120° C.

12 Claims, No Drawings

BLOWING AGENT COMPOSITION AND POLYMERIC FOAM CONTAINING A NORMALLY-LIQUID HYDROFLUROCARBON AND CARBON DIOXIDE

Cross Reference Statement

This application claims the benefit of U.S. Provisional Application No. 60/257,482, filed Dec. 21, 2000 and is a continuation of U.S. application Ser. No. 09/997,744, filed Nov. 29, 2001.

BACKGROUND OF THE INVENTION

1. Field of the Invention

The present invention relates to blowing agent compositions containing carbon dioxide ($CO_2$) and a normally-liquid hydrofluorocarbon (HFC), foamable polymer compositions comprising a polymer and such blowing agent compositions, the use of such compositions for preparing polymeric foam, and polymeric foam containing residuals of the blowing agent composition. A normally-liquid HFC has a boiling point of 14° C. or higher, preferably 30° C. or higher, and lower than about 120° C. at one atmosphere of pressure.

2. Description of Related Art $CO_2$ is an attractive blowing agent for preparing polymeric foam because it does not contribute to volatile organic compound (VOC) emissions and poses little, if any, risk to the Earth's ozone layer. However, as a sole blowing agent, $CO_2$ tends to produce polymeric foam having a higher percentage of open cells, smaller cell sizes, and a higher thermal conductivity than is desirable, particularly for thermal insulating applications. Furthermore, polymeric foams having infrared blockers such as carbon black are difficult to make using only $CO_2$ as a blowing agent.

Hydrofluorocarbons (HFCs) are also attractive blowing agent components, particularly for preparing thermally insulating polymeric foams. HFCs are increasingly attractive as replacements for hydrochlorofluorocarbons (HCFCS) and chlorofluorocarbons (CFCs), which can contribute to ozone depletion. As with $CO_2$, HFCs pose little, if any, risk to the Earth's ozone layer. Furthermore, HFCs have a thermal conductivity lower than most polymers or blowing agents (other than HCFCs and CFCs) so HFC residuals in a polymeric foam can lower the foam's thermal conductivity.

Typically, HFCs in blowing agent compositions have a boiling point of 14° C. or less (HFC(g)). Unfortunately, HFC(g)s permeate out of polymeric foam and escape into the atmosphere, which can result in both an increase in the foam thermal conductivity and organic emissions.

A need exists in the art of blowing agents for a composition that is safe for the environment and produces thermally insulating polymeric foam. Preferably, the composition contains a HFC that remains in polymeric foam longer than HFC(g)s thereby slowing or reducing thermal conductivity increases and organic emission levels experienced when using HFC(g)s. More preferably, the composition comprises $CO_2$ and a HFC that at least partially compensates for $CO_2$ deficiencies.

DEFINITIONS

"Hydrofluorocarbon" and "HFC" are interchangeable terms and refer to an organic compound containing hydrogen, carbon, and fluorine. The compound is substantially free of halogens other than fluorine.

"Boiling point" refers to the boiling point at one atmosphere pressure.

"Normally-gaseous material" refers to a material that has a boiling point lower than 14° C.

"Normally-liquid hydrofluorocarbon", "normally-liquid HFC", and "HFC(l)" are interchangeable terms and refer to a HFC that has a boiling point of 14° C. or higher and lower than about 120° C.

"Normally-gaseous hydrofluorocarbon", "normally-gaseous HFC", and "HFC(g)" are interchangeable terms and refer to a HFC that has a boiling point lower than 14° C.

"Low-boiling alcohol" and "LBA" are interchangeable terms and refer to an alcohol having a boiling point lower than about 120° C.

"Low-boiling carbonyl compound" and "LBC" are interchangeable terms and refer to an aldehyde or a ketone having a boiling point lower than about 120° C.

"Low-boiling hydrocarbons" and "LBHs" are interchangeable terms and refer to hydrocarbons having a boiling point lower than 55° C., including halogenated hydrocarbons.

"Low-boiling ethers" and "LBEs" are interchangeable terms and refer to ethers having a boiling point lower than 55° C., including halogenated ethers.

"Fresh" refers to within one month, preferably within one week, more preferably within one day, still more preferably within one hour, most preferably immediately after manufacture.

A polymeric foam or blowing agent composition that is "essentially free" of a specified component or components refers, respectively, to a polymeric foam or blowing agent composition that contains ten weight-percent (wt %) or less, preferably five wt % or less, more preferably one wt % or less, still more preferably 0.5 wt % or less, most preferably zero wt % of the specified component(s) based, respectively, on foam or blowing agent composition weight.

A blowing agent composition "consisting essentially of" a specified component or components is free from any unspecified components at concentrations that modify how the composition performs in preparing polymeric foam. Commonly, a blowing agent composition "consisting essentially of" a specified component or components refers to a composition that contains 90 wt % or more, preferably 95 wt % or more, more preferably 99 wt % or more, still more preferably 99.5 wt % or more, most preferably 100 wt % of the specified component(s). Wt % is relative to weight of blowing agent composition.

BRIEF SUMMARY OF THE INVENTION

In a first aspect, the present invention is a blowing agent composition comprising: (a) carbon dioxide; and (b) at least one hydrofluorocarbon having a boiling point of 30° C. or higher and lower than about 120° C.; said composition being essentially free of low-boiling ethers and low-boiling hydrocarbons other than (b). 1,1,1,3,3-pentafluorobutane is a preferred hydrofluorocarbon in the first aspect.

In a second aspect, the present invention is a blowing agent composition comprising: (a) carbon dioxide; and (b) at least one hydrofluorocarbon having a boiling point of 14° C. or higher and lower than about 120° C.; wherein greater than 50 weight-percent of the composition is carbon dioxide and wherein a sufficient amount of (b) is present to produce a polymeric foam having an improved skin quality, lower open cell content (according to ASTM method D-6226), larger average cell size, improved skin quality, or any combination thereof relative to the same foam prepared using only carbon dioxide as a blowing agent. Preferably, at least one hydrocarbon in (b) of the second aspect is 1,1,1,3,3-pentafluorobutane.

One preferred embodiment of the second aspect further comprises: (c) at least one hydrofluorocarbon having a boiling point lower than 14° C.; and (d) at least one additional blowing agent selected from water, alcohols, ketones and aldehydes; said alcohols, ketones and aldehydes having a boiling point lower than about 120° C. at atmospheric pressure.

The first and second aspects of the invention can further comprise additional blowing agents selected from water and alcohols having a boiling point lower than about 120° C, particularly ethanol.

In a third aspect, the present invention is a blowing agent composition consisting essentially of carbon dioxide and one hydrofluorocarbon having a boiling point of 14° C. or higher and lower than about 120° C. Carbon dioxide is preferably liquefied in each of the embodiments of the first three aspects.

In a fourth aspect, the present invention is a process for preparing polymeric foam comprising expanding a foamable polymer composition in a process suitable for forming a polymeric foam using a blowing agent composition selected from a group consisting of the blowing agent compositions of the first three aspects.

In a fifth aspect, the present invention is a polymeric foam comprising: (a) a polymer having cells defined therein; (b) carbon dioxide; and (c) at least one hydrofluorocarbon having a boiling point of 30° C. or higher and lower than about 120° C.; wherein at least a portion of (b) and (c) resides in said cells and said polymeric foam is essentially free of any low-boiling ethers or low-boiling hydrocarbons other than the hydrofluorocarbon (c).

In a sixth aspect, the present invention is a polymeric foam comprising: (a) a polymer having cells defined therein; (b) carbon dioxide; (c) at least one hydrofluorocarbon having a boiling point of 14° C. or higher and lower than about 120° C.; (d) at least one hydrofluorocarbon having a boiling point lower than 14° C.; (e) at least one additional blowing agent selected from water, alcohols, ketones, and aldehydes; said alcohols, ketones and aldehydes having a boiling point lower than about 120° C.; and (f) an infrared blocker selected from a group consisting of carbon black, graphite, gold, aluminum, and titanium dioxide; wherein at least a portion of (b), (c), (d), and (e) reside in said cells and (f) is dispersed in said polymer.

Blowing agent components usually migrate from within polymeric foam and air migrates into polymeric foam over time. Therefore, preferably characterize polymeric foams within the time frame set forth by "fresh", most preferably immediately after manufacture of the foam. Blowing agents have less of an opportunity to escape from a foam and air has less of an opportunity to migrate into a foam within the "fresh" time frame.

In a seventh aspect, the present invention is a foamable polymer composition comprising a thermoplastic polymer having dispersed therein a blowing agent composition selected from a group consisting of the blowing agents of the first three aspects of the present invention.

In an eighth aspect, the present invention is a foamable polymer composition comprising a thermoplastic polymer having dispersed therein an infrared blocker and a blowing agent composition that comprises carbon dioxide and a hydrofluorocarbon having a boiling point of 14° C. or higher.

The present invention addresses a need in the art for a blowing agent composition that is safe for the environment and produces a thermally insulating polymeric foam. The composition contains a HFC(l), which tends to remain in polymeric foam longer than HFC(g)s, slowing or reducing thermal conductivity increases and organic emission levels experienced when using HFC(g)s.

DETAILED DESCRIPTION OF THE INVENTION

This invention relates to a blowing agent composition comprising $CO_2$ and a HFC(l). Some embodiments of the present invention may also comprise additional blowing agents.

Blowing agent compositions of the present invention contain an amount of $CO_2$ from greater than zero wt % up to, but not including, 100 wt % based on blowing agent composition weight. Herein, $CO_2$ in a blowing agent composition is preferably liquefied $CO_2$. The concentration of $CO_2$ is generally greater than 20 wt %, preferably greater than 30 wt %, more preferably greater than 40 wt %, and most preferably greater than 50 wt %, based on blowing agent composition weight.

Blowing agent compositions that are mostly (greater than 50 wt % based on blowing agent composition weight) $CO_2$ are desirable because $CO_2$ is a readily available material that is safe for Earth's atmosphere. However, experience shows that preparing thermoplastic foams using a blowing agent composition that is mostly $CO_2$ is difficult to process, often resulting in a foam having poor foam skin quality and an open-cell structure. Foams having poor skin quality have an unacceptable level of surface irregularities such as cracks, stretch marks, and ripples. Fabrication of thermoplastic foams containing infrared blockers, such as graphite and carbon black, are particularly challenging with a $CO_2$ blowing agent and often results in foams with smaller cell sizes, higher percentage of open cells, and/or more highly fractured skin surfaces than foams prepared without the infrared blockers.

The present invention is the result of discovering that including at least one HFC(l) with $CO_2$ can overcome the difficulties associated with a $CO_2$ blowing agent. Surprisingly, including one part per hundred or more, preferably two parts or more, more preferably three parts or more HFC(l), by weight of a polymer resin, in a $CO_2$ blowing agent composition is generally sufficient to prepare a polymeric foam that has better skin quality (fewer surface irregularities), larger average cell size, lower open-cell content, or any combination thereof as compared to the same foam prepared using only $CO_2$ as a blowing agent.

HFC(l)s are also particularly desirable in preparing thermally insulating foam. HFCs, in general, have a lower thermal conductivity than polymers. Therefore, residual HFC in a polymeric foam typically lowers the foam's thermal conductivity relative to a similar polymeric foam without the residual HFC. HFC(l)s have a lower vapor pressure than HFC(g)s, therefore they tend to permeate out of polymeric foam less readily than HFC(g)s. As a result, blowing agent compositions containing an HFC(l) produce a polymeric foam that demonstrates a slower thermal conductivity increase over time than a polymeric foam prepared using a HFC(g) instead of HFC(l). Furthermore, because HFC(l)s tend to remain in a foam longer than HFC(g)s, they contribute less to organic emissions than HFC(g)s. HFC(l)s are also easier to handle than normally-gaseous materials because of their lower vapor pressure. For example, pressure liquefaction commonly used for normally-gaseous materials is not necessary for HFC(l)s.

HFC(l)s suitable for use in the present invention include any HFC having a boiling point of 14° C. or higher, preferably 30°C. or higher, and lower than about 120° C. Examples of suitable HFC(l)s include aliphatic compounds such as 1,1,1,3,3-pentafluoropropane (HFC-245fa), 1,1,1,3,3-pentafluorobutane (HFC-365mfc), 1-fluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethyl cyclohexane, and perfluorooctane; as well as aromatic compounds such as fluorobenzene, 1,2-difluorobenzene; 1,4-difluorobenzene, 1,3-difluorobenzene; 1,3,5-trifluorobenzene; 1,2,4,5-tetrafluorobenzene, 1,2,3,5-tetrafluorobenzene, 1,2,3,4-tetrafluorobenzene, pentafluorobenzene, hexafluorobenzene, and 1-fluro-3-(trifluoromethyl)benzene. Aromatic HFCs may be especially compatible with aromatic polymers and, as a result, remain within polymeric foam prepared with an aromatic polymer longer than non-aromatic HFCs. Therefore, aromatic HFCs may be attractive for use with aromatic polymers. In general, HFC-365mfc and HFC-245fa are preferred due to their increasing availability and ease of use, with HFC-365mfc more preferred because it has a higher boiling point than HFC-245fa. The HFC(l)s having a boiling point higher than 30° C., such as HFC-365mfc, are particularly desirable because they do not require liquefaction during foam processing.

Additionally, within the blowing agent compositions of the present invention, the HFC(l) preferably has a boiling point of 30° C. or higher if the composition comprises $CO_2$ and only one HFC(l); and the composition is essentially free of low-boiling ethers and low-boiling hydrocarbons other than the HFC(l).

The HFC(l) in a blowing agent composition can have a boiling point of 14° C or higher to about 120° C. if: (a) greater than 50 wt % of the blowing agent composition is $CO_2$, and the composition contains at least one HFC(l); (b) greater than 50 wt % of the composition is $CO_2$ and the composition further comprises a HFC having a boiling point lower than 14° C. and at least one additional blowing agent selected from water, low-boiling alcohols and low boiling carbonyl compounds; or (c) the composition consists essentially of $CO_2$ and one HFC.

The concentration of HFC(l), relative to the total weight of blowing agent composition, is greater than zero wt %, typically one wt % or more, preferably two wt % or more, more preferably three wt % or more; and typically 95 wt % or less. Above 95 wt %, excessive polymer plasticization occurs, yielding poor polymeric foam. The concentration of HFC(l) relative to the blowing agent composition, for example, can be 5 wt % or more, 10 wt % or more, 25 wt % or more; 50 wt % or more wt %, or 75 wt % or more as desired.

The blowing agent composition may further comprise at least one additional blowing agent. Additional blowing agents are useful for reducing polymeric foam density by increasing total moles of blowing agent. Preferably, additional blowing agents allow one to increase moles of blowing agent without suffering from at least one of the following: decreased cell size, increased density, decreased dimensional stability, and increased cost.

Additional blowing agents include physical and chemical blowing agents. Suitable physical blowing agents include water; HFC(g)s such as methyl fluoride, difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 2,2-difluoropropane (HFC-272fb), 1,1,1-trifluoropropane (HFC-263fb), and 1,1,1,2,3,3,3-heptafluoropropane (HFC-227ea); inorganic gases such as argon, nitrogen, and air; organic blowing agents such as aliphatic hydrocarbons having from one to nine carbons ($C_1$–$C_9$) including methane, ethane, propane, n-butane, isobutane, n-pentane, isopentane, neopentane, cyclobutane, and cyclopentane; fully and partially halogenated aliphatic hydrocarbons having from one to four carbons ($C_1$–$C_4$); and aliphatic alcohols having from one to five carbons ($C_1$–$C_5$) such as methanol, ethanol, n-propanol, and isopropanol; carbonyl containing compounds such as acetone, 2-butanone, and acetaldehyde. Suitable chemical blowing agents include azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate. Preferred additional blowing agents include LBAs such as methanol, ethanol, and isopropanol; LBCs such as acetone, 2-butanone, and acetaldehyde; water; and HFC(g)s.

In general, the concentration of any individual additional blowing agent is desirably below the solubility limit of that blowing agent in the polymer, taking into account the presence of the rest of the blowing agent composition. A skilled artisan can, without undue experimentation, determine appropriate amounts of additional blowing agents for a given blowing agent composition. Additional blowing agents can comprise 20 wt % or less, more generally 30 wt % or less, still more generally 40 wt % or less, most generally 60 wt % or less of the blowing agent composition. The blowing agent composition can be substantially free of any additional blowing agent.

HFC(l), $CO_2$, and any additional blowing agents account for 100 wt % of the blowing agent composition.

One example of a suitable blowing agent composition has 30 wt % to 70 wt % (inclusive) HFC-365mfc with the balance to 100 wt % being $CO_2$.

Another example of a suitable blowing agent composition is 20–30 wt % HFC-365mfc, and the balance to 100 wt % being $CO_2$ and at least one additional blowing agent (preferably HFC-134a, ethanol, or a mixture thereof).

The present invention further relates to a process for preparing a polymeric foam by expanding a polymer in a process suitable for forming a polymeric foam and using a blowing agent composition of the present invention. Typically, the blowing agent composition is present at a concentration, by weight relative to polymer weight, of greater than zero parts per hundred (pph) and less than or equal to 20 pph. Blowing agent compositions above 20 pph, based on polymer, produce polymeric foam having undesirable properties such as higher densities than desired for insulation applications. The concentration of blowing agent composition, based on polymer weight, desirably is 4 pph or more, preferably 5 pph or more; and 18 pph or less, preferably 15 pph or less, more preferably 12 pph or less.

Any conventional blown foam process is suitable for preparing a polymeric foam using the blowing agent composition of this invention. Generally, prepare a polymeric foam by plasticizing a polymer (typically heat plasticizing a thermoplastic polymer), incorporating therein a blowing agent composition at an initial pressure to form a foamable polymer composition, exposing the foamable polymer composition to a foaming pressure that is lower than the initial pressure, and allowing the foamable polymer composition to expand into a polymeric foam. Normally, plasticize a thermoplastic polymer by heating it to a processing temperature at or above the polymer's glass transition temperature, forming a heat plasticized polymer composition. Add the blowing agent composition to the heat plasticized polymer composition to form a foamable polymer composition. Add components of the blowing agent composition individually or in any number of combinations. Incorporate the blowing agent composition into the plasticized polymer composition by a batch or continuous process, such as mixing with an extruder or mixer blender. The initial pressure is sufficient to prevent substantial expansion of the foamable polymer composition and to generally disperse the blowing agent therein. The initial pressure is often greater than atmospheric pressure (760 mm of mercury). Either reduce the pressure around the foamable polymer composition to a foaming pressure or transport the foamable polymer composition into a foaming zone at a foaming pressure to initiate expansion of the foamable polymer composition into a foam. The foaming pressure is less than the initial pressure and can be above or below atmospheric pressure, but is typically atmospheric pressure. The foaming pressure is sufficiently low to allow the blowing agent composition to expand the foamable polymer composition.

Cooling the heat plasticized foamable polymer composition below the processing temperature prior to exposing the foamable polymer composition to the foaming pressure can improve polymeric foam properties. One may cool the foamable polymer composition in an extruder or other mixing device or in separate heat exchangers.

A skilled artisan recognizes there are many variations of the general procedure as well as other ways to prepare polymeric foam that are suitable within the present invention. For example, U.S. Pat. No. 4,323,528, herein incorporated by reference, discloses a process for making polyolefin foams via an accumulating extrusion process. The accumulating extrusion process comprises: 1) mixing a thermoplastic material and a blowing agent composition to form a foamable polymer composition; 2) extruding the foamable polymer composition into a holding zone maintained at a temperature and pressure that precludes foaming; the holding zone has a die defining an orifice opening into a zone of lower pressure at which the foamable polymer composition foams and an openable gate closing the die orifice; 3) periodically opening the gate and, substantially concurrently, applying mechanical pressure by means of a movable ram on the foamable polymer composition to eject it from the holding zone through the die orifice into the zone of lower pressure, and 5) allowing the ejected foamable polymer composition to expand to form the polymeric foam.

Suitable polymers for use in the present invention include thermoplastic polymers, particularly those from a group consisting of vinyl aromatic polymers such as polystyrene; rubber-modified vinyl aromatic polymers such as high impact polystyrenes (HIPS); vinyl aromatic copolymers such as styrene/acrylonitrile or styrene/butadiene; hydrogenated vinyl aromatic polymers and copolymers such as hydrogenated polystyrene and hydrogenated styrene/butadiene copolymers; alpha-olefin homopolymers such as low density polyethylene, high density polyethylene and polypropylene; linear low density polyethylene (an ethylene/octene-1 copolymer) and other copolymers of ethylene with a copolymerizable, mono-ethylenically unsaturated monomer such as an alpha-olefin having from 3 to 20 carbon atoms; copolymers of propylene with a copolymerizable, mono-ethylenically unsaturated monomer such as an alpha-olefin having from 4 to 20 carbon atoms, copolymers of ethylene with a vinyl aromatic monomer, such as ethylene/styrene interpolymers; ethylene/propylene copolymers; copolymers of ethylene with an alkane such as an ethylene/hexane copolymer; thermoplastic polyurethanes (TPU's); and blends or mixtures thereof, especially blends of polystyrene and an ethylene/styrene interpolymer.

Other suitable polymers include polyvinyl chloride, polycarbonates, polyamides, polyimides, polyesters such as polyethylene terephthalate, polyester copolymers and modified polyesters such as polyethylene terephthalate-glycol (PETG), phenol-formaldehyde resins, thermoplastic polyurethanes (TPUs), biodegradable polysaccharides such as starch, and polylactic acid polymers and copolymers.

The polymer is preferably polyethylene (PE), polystyrene (PS), polypropylene (PP), a blend of PS and an ethylene/styrene interpolymer (ESI), a blend of ESI and PE, a blend of ESI and PP, a blend of PS, PE and ESI or a blend of ESI with any one or more polyolefin or ethylene/alpha-olefin copolymers, terpolymers or interpolymers produced using a metallocene catalyst or a constrained geometry catalyst (such as The Dow Chemical Company's INSITE® catalysts, INSITE is a trademark of The Dow Chemical Company). A more preferred polymer is PS.

Foamable polymer compositions can include additional additives, such as those that are common for use in preparing blown polymeric foam. Examples of suitable additional additives include pigments, viscosity modifiers, flame retardants, infrared blockers (such as those selected from a group consisting of carbon black, graphite, gold, aluminum, and titanium dioxide), nucleating agents, permeation modifiers, and extrusion aids. Additional additives typically become dispersed within the polymer.

The present invention still further relates to a blown polymeric foam containing residuals from the blowing agent composition including a HFC(l) and $CO_2$. The polymeric foam may further contain additional blowing agents when they are included in the blowing agent composition. One may identify the presence of a HFC(l), $CO_2$, and any additional blowing agents using standard analytical techniques, such as gas chromatography. Polymeric foams of the present invention are particularly useful as thermal insulators.

Polymeric foams of the present invention may take any physical configuration know in the art, such as sheet, plank, or coalesced, parallel strands and sheets. The polymeric foam is preferably a plank, more preferably a plank having a cross-section of 30 square centimeters ($cm^2$) or more and a cross-section thickness in a minor dimension of 0.25 inch (6.4 millimeters (mm)) or greater, more preferably 0.375 inch (9.5 mm) or greater, and still more preferably 0.5 inch (12.7 mm) or greater. A polymeric foam having a minor dimension of up to 8 inches (200 mm) is possible. The upper limit for the minor dimension is limited by foaming equipment limitations. Given large enough equipment, a minor dimension above 8 inches (200 mm) is conceivable.

Polymeric foams of the present invention preferably have a density of 10 kilograms per cubic meter ($kg/m^3$) or greater, normally 25 $kg/m^3$ or greater; and 100 $kg/m^3$ or less, normally 45 $kg/m^3$ or less. Foams having a density below 10 $kg/m^3$ generally lack a desired structural integrity. Polymeric foam of the present invention may have a density up to, but not including, that of a combination of the polymer and additives used in preparing the foam.

Polymeric foam of the present invention can be open-celled (having greater than 20% open-cell content) or close-celled (having less than 20% open-cell content), but foam that has less than 10 percent open-celled content is preferable because it generally has a lower thermal conductivity than a more open-celled foam. Measure open-cell content according to American Society for Testing and Materials (ASTM) method D2856-A. Typically, a polymeric foam of the present invention has a thermal conductivity 90 days after preparation (as determined according to standard method EN28301 using a sample temperature of 10° C.) of 35 milliwatt per meter-Kelvin (mW/m·K) or less, preferably 33 mW/m·K or less.

Polymeric foams of the present invention have an average cell size greater than 0.05 millimeters (mm), preferably greater than 0.075 mm, more preferably greater than 0.1 mm, and less than 2 mm, preferably less than 1.2 mm. Determine average cell size using ATSM method D3576 with the following modifications: (1) image a foam using optical or electron microscopy rather than projecting the image on a screen; and (2) scribe a line of known length that spans greater than 15 cells rather than scribing a 30 mm line.

The following examples further illustrate but do not limit the scope of the invention. For the following examples, determine density according to ASTM method D-1622, average cell size according to ASTM method D-3576 with the earlier mentioned modifications, open-cell content according to ASTM method D-2856, and thermal conductivity according to standard method EN-28301 using a sample temperature of 10° C. Measure thermal conductivity values for each foam either 29 days after manufacturing (29-day lambda) or 90 days after manufacturing (90-day lambda), as indicated below. All pph values in the Comparative Examples and Examples are weight parts per hundred weight parts polymer resin.

Measure residual blowing agent in a foam using head-space gas-chromatography. Place a 5 gram sample of foam in a vacuum oven, purge with helium for 2–3 minutes, apply a vacuum, and then heat the sample in the oven to 160° C. while under vacuum. Inject a sample of gas from the vacuum oven into a gas chromatograph equipped with 2 different columns: (1) 5% SP 1200 plus 1.75% Bentone on Chromosorb W-HP, and (2) Hayesep Q. The oven temperature for the columns is 130° C. The first column separates volatile aromatic and unsaturated organics. The second column separates carbon monoxide and carbon dioxide and air. Use a Type Carle Series 400 detector to measure gas components through the columns.

COMPARATIVE EXAMPLE (COMP EX) A

PS Foam Blown with Only Carbon Dioxide

Melt 100 weight parts of PS resin (90 weight parts XZ40 PS resin and 10 weight parts PS680 resin, both from The Dow Chemical Company) in a 50 mm single screw extruder at 200° C together with 2.8 parts per hundred (pph) hexabromocyclododecane, 0.15 pph copper phthalocyanine concentrate (20 wt % copper phthalocyanine in PS resin), 0.2 pph barium stearate, 0.4 pph linear low density polyethylene (DOWLEX® 2247A, DOWLEX is a trademark of The Dow Chemical Company), and 0.15 pph tetrasodiumpyrophosphate to form a polymer melt. XZ40 PS resin is a has a weight average molecular weight ($M_w$) of 151,000; a polydispersity ($M_w/M_n$) of 3.1; and a melt flow index (MFI) of 33 grams per 10 minutes (g/10 min). Determine MFI using ASTM method D-1238 (190° C., 5 kg load).

Inject 4.7 pph $CO_2$ into the polymer melt at a pressure of 164 bar (16.4 megapascals (MPa)) and mix. Cool to 125° C. and expand the polymer mix through a slit die (50 mm wide with a 0.8 mm opening) to atmospheric pressure, forming a 30 mm thick and 180 mm wide polymeric foam (Comp Ex A).

Properties for Comp Ex A are in Table 1, below.

EXAMPLE (EX) 1–3

PS Foam Blown with Carbon Dioxide and HFC-365mfc

Prepare Ex 1–3 in a manner similar to Comp Ex A, using a blowing agent composition consisting of $CO_2$ and HFC- 365mfc (from Atofina) for the blowing agent. The concentration of $CO_2$ and HFC-365mfc for each Ex is in Table 1. Maintain the total moles of blowing agent per 100 grams of PS (mol/100 gPS) at 0.10–0.11 in an effort to maintain a constant amount of blowing agent molecules.

TABLE 1

| Property | Units | Comp Ex A | Ex 1 | Ex 2 | Ex 3 |
|---|---|---|---|---|---|
| $CO_2$ Concentration | wt % of blowing agent composition | 100 | 68 | 51 | 32 |
| HFC-365 mfc Concentration | wt % of blowing agent composition | 0 | 32 | 49 | 68 |
| Blowing Agent Composition Concentration | pph based on PS | 4.7 | 5.9 | 7.1 | 8.8 |
| Total Blowing Agent | mol/100 gPS | 0.11 | 0.11 | 0.11 | 0.10 |
| Residual HFC-365 mfc 90 days after manufacture | Wt % relative to PS resin weight | 0 | 30 | 42 | 49 |
| Density | kg/m³ | 41 | 40 | 38 | 38 |
| Average Cell Size | mm | 0.2 | 0.2 | 0.2 | 0.3 |
| Open-Cell Content | percent | 0.8 | 0.7 | 2.2 | 2.7 |
| 90-Day Lambda | mW/m · K | 36 | 34 | 33 | 31 |

Ex 1–3 illustrate that replacing $CO_2$ with HFC-365mfc in a blowing agent composition for PS foam produces a PS foam with lower 90-day thermal conductivities than a similar foam blown with only $CO_2$ (Comp Ex A). Ex 1–3 also retain a measurable amount of HFC-365mfc in the foam 90 days after manufacture.

Ex 3 further illustrates that a blowing agent composition containing 32 wt % HFC-365mfc, an HFC(l), and 68 wt % $CO_2$ produces a foam having a larger average cell size than a similar foam prepared with only $CO_2$ (Comp Ex A).

COMP EX B

PS Foam Blown with Carbon Dioxide and HFC-134a

Prepare a foam in a manner similar to Comp Ex A except use a blowing agent composition consisting of 70 wt % $CO_2$ and 30 wt % HFC-134a. The blowing agent composition comprises 5.9 pph of blowing agent (based on PS weight) and 0.11 mol/100 gPS of blowing agent. Foam properties for Comp Ex B are in Table 2, below.

EX 4–6

PS Foam Blown with Carbon Dioxide, HFC-134a, and HFC-365mfc

Prepare Ex 4–6 in a manner similar to Comp Ex B except replace a portion of the $CO_2$ and HFC-134a with HFC-365mfc. Table 2 contains ratios each component in the blowing agent composition along with foam parameters for each of Ex 4–6. Maintain the total mol/100 gPS of blowing agent at 0.10–0.11 in an effort to maintain a constant amount of blowing agent molecules.

Ex 4–6 illustrates that replacing $CO_2$ and HFC-134a with HFC-365mfc (an HFC with a boiling point of higher than 30° C.) in a blowing agent composition for PS foam produces PS with lower 90-day thermal conductivities and larger average cell sizes. Data in Table 2 for Ex 4–6 also illustrate that HFC-365mfc remains in a PS foam longer than HFC-134a.

TABLE 2

| Property | Units | Comp Ex B | Ex 4 | Ex 5 | Ex 6 |
|---|---|---|---|---|---|
| $CO_2$ Concentration | wt % of blowing agent composition | 70 | 57 | 55 | 32 |
| HFC-134 a Concentration | wt % of blowing agent composition | 30 | 31 | 14 | 0 |
| HFC-365 mfc Concentration | wt % of blowing agent composition | 0 | 12 | 31 | 68 |
| Blowing Agent Composition Concentration | pph based on PS | 5.9 | 6.35 | 6.5 | 8.8 |
| Total Blowing Agent | mol/100 gPS | 0.11 | 0.11 | 0.10 | 0.10 |
| Residual HFC-134 a 90 days after manufacture | wt % relative to PS resin weight / % of original loading | 23 / 77 | 26 / 85 | 7 / 50 | 0 / — |
| Residual HFC-365 mfc 90 days after manufacture | wt % relative to PS resin weight / % of original loading | 0 / — | 11 / 92 | 22 / 71 | 49 / 72 |
| Density | kg/m³ | 48 | 47 | 36 | 38 |
| Average Cell Size | mm | 0.15 | 0.22 | 0.19 | 0.26 |
| Open-Cell Content | percent | 0 | 0 | 1 | 3 |
| 90-Day Lambda | mW/m · K | 33 | 30 | 32 | 31 |

EX 7–9

PS Blown with Carbon Dioxide and HFC-245fa

Prepare Ex 7–9 in a manner similar to Comp Ex A except use a blowing agent composition consisting of $CO_2$ and HFC-245fa. Table 3 contains blowing agent composition ratios and foam properties for Ex 7–9 and Comp Ex A.

TABLE 3

| Property | Units | Comp Ex A | Ex 7 | Ex 8 | Ex 9 |
|---|---|---|---|---|---|
| $CO_2$ Concentration | wt % of blowing agent composition | 100 | 81 | 66 | 57 |
| HFC-245 fa Concentration | wt % of blowing agent composition | 0 | 19 | 34 | 43 |
| Blowing Agent Composition Concentration | pph based on PS | 4.7 | 5.2 | 5.9 | 6.9 |
| Total Blowing Agent | mol/100 gPS | 0.11 | 0.1 | 0.1 | 0.1 |
| Residual HFC-245 fa 90 days after manufacture | wt % relative to PS resin weight | 0 | 6 | 19 | 24 |
| Density | kg/m³ | 41 | 39 | 41 | 40 |
| Average Cell Size | mm | 0.21 | 0.25 | 0.25 | 0.27 |
| 90-Day Lambda | mW/m · K | 36 | 34 | 33 | 34 |

Ex 7–9 illustrate that partially replacing $CO_2$ in a blowing agent composition for PS foam with HFC-245fa, a HFC(l), produces PS foam with a lower 90-day lambda and larger average cell size.

Ex 7–9 further illustrate that HFC-245fa, a HFC(l), in combination with $CO_2$ produces a polymeric foam having a larger average cell size relative to a foam prepared using only $CO_2$ as a blowing agent.

EX 11–12

PS Foam Blown with Carbon Dioxide, HFC-365mfc, and HFC-245fa

Prepare Ex 11–12 in a manner similar to Comp Ex A accept use a blowing agent composition consisting of $CO_2$, HFC-365mfc, and HFC-245fa. Table 5 contains blowing agent composition ratios and foam properties for Comp Ex A and Ex 11–12.

Ex 11–12 illustrate that by partially replacing $CO_2$ with HFC-365mfc and HFC-245fa in a blowing agent composition for PS foam produces a PS foam having a lower 90-day lambda value than a similar PS foam blown with only $CO_2$ (Comp Ex A).

TABLE 5

| Property | Units | Comp Ex A | Ex 11 | Ex 12 |
| --- | --- | --- | --- | --- |
| $CO_2$ Concentration | wt % of blowing agent composition | 100 | 74 | 55 |
| HFC-365 mfc Concentration | wt % of blowing agent composition | 0 | 17 | 30 |
| HFC-245 fa Concentration | wt % of blowing agent composition | 0 | 9 | 15 |
| Blowing Agent Composition Concentration | pph based on PS | 4.7 | 5.7 | 6.6 |
| Total Blowing Agent | mol/100 gPS | 0.1 | 0.1 | 0.1 |
| Residual HFC-365 mfc 90 days after manufacture | Wt % relative to PS resin weight | — | 17 | 22 |
| Residual HFC-245 fa 90 days after manufacture | Wt % relative to PS resin weight | — | 0 | 1.5 |
| Density | kg/m³ | 41 | 41 | 40 |
| Average Cell Size | mm | 0.21 | 0.2 | 0.3 |
| Open-Cell Content | percent | 0.83 | 1.0 | 2.3 |
| 90-Day Lambda | mW/m · K | 36 | 35 | 34 |

EX 13–15

PS Foam using Blowing Agent Composition Comprising Ethanol

Prepare Ex 13–15 in a manner similar to Comp Ex A except use blowing agent compositions containing $CO_2$, an HFC, and ethanol. Table 6 contains blowing agent compositions and properties for Ex 13–15.

TABLE 6

| Property | Units | Ex 13 | Ex 14 | Ex 15 |
| --- | --- | --- | --- | --- |
| $CO_2$ Concentration | wt % of blowing agent composition | 51 | 51 | 53 |
| HFC-365 mfc Concentration | wt % of blowing agent composition | 21 | 26 | 0 |
| HFC-245 fa Concentration | wt % of blowing agent composition | 14 | 0 | 27 |
| HFC-134 a Concentration | wt % of blowing agent composition | 0 | 13 | 0 |
| Ethanol Concentration | wt % of blowing agent composition | 14 | 10 | 20 |
| Blowing Agent Composition Concentration | pph based on PS | 7.1 | 7.65 | 7.4 |
| Total Blowing Agent | mol/100 gPS | 0.12 | 0.13 | 0.14 |
| Residual HFC-365 mfc 90 days after manufacture | Wt % relative to PS resin weight | 14 | 23 | 0 |
| Residual HFC-245 fa 90 days after manufacture | Wt % relative to PS resin weight | 10 | 9 | 18 |
| Density | kg/m³ | 33 | 35 | 34 |
| Average Cell Size | mm | 0.27 | 0.17 | 0.25 |
| Open-Cell Content | percent | 1.5 | 0.9 | 0.6 |
| 90-Day Lambda | mW/m · K | 34 | 35 | 35 |

Ex 13–15 illustrate that low boiling alcohols, specifically ethanol, can be part of a PS foam blowing agent composition along with $CO_2$ and one or more HFC having a boiling point of 14° C. or higher and lower than 120° C.

COMP EX C

Carbon Black Containing Foam

Prepare Comp Ex C by melt-blending in a 64 mm single screw extruder PS resin ($M_w$ of 168,000 and $M_w/M_n$ of 2.44; MFI of 11 g/10 min) with 5 pph of carbon black concentrate (concentrate is 50% by weight AROSPERSE® carbon black in polystyrene resin; AROSPERSE is a trademark of the J. M. Huber Corporation and is available from Engineered Carbons, Inc.), 2.8 pph hexabromocyclododecane, 0.2 pph barium stearate, 0.2 pph DOWLEX 2247A linear low density polyethylene, and 0.15 pph tetrasodiumpyrophosphate to form a polymer melt. All pph values are relative to weight parts of PS resin (including both neat PS resin and that in the carbon black concentrate). Heat the polymer melt to 200° C. and inject 4.7 pph $CO_2$. Cool the polymer melt to 123° C. and extrude through a slit die 50 mm wide having a gap of 1.8 mm. The polymer melt fractures during extrusion when forming to a 25 mm thick and 180 mm wide polymeric foam board.

EX 16

Carbon Black with HFC-365mfc and $CO_2$

Prepare Ex 16 as described for Comp Ex C using 0.11 mol/100 gPS of a blowing agent composition consisting of 39 wt % $CO_2$ and 61 wt % HFC-365mfc (wt % based on blowing agent composition weight). Extrude and form into a continuous board 25 mm thick and 180 mm wide. The resulting foam contains 2.5 pph carbon black, has a density of 52 kg/m³, an open-cell content of 4.4%, and is free from surface fractures.

Ex 16 illustrates, in light of Comp Ex C, that HFC-365mfc can act as an aid in manufacturing a carbon black-30 containing PS foam using a $CO_2$ blowing agent composition in a formulation and under condition that, in the absence of HFC-365mfc, fractures during extrusion.

Comp EX D,E,F, and G

Prepare Comp Ex D by melt-blending in a 64 mm single screw extruder PS resin ($M_w$ of 168,000 and $M_w/M_n$ of 2.44; MFI of 11 g/10 min) with 15 pph carbon black concentrate (33 wt % SEVACARB® MT-LS carbon black in the PS resin described; SEVACARB is a trademark of Columbian Chemicals Company), 2.6 pph hexabromocyclododecane, 0.2 pph barium stearate, 0.4 pph DOWLEX 2247A linear low density polyethylene, and 0.2 pph tetrasodiumpyrophosphate to form a polymer melt. All pph are weight parts relative to weight parts PS resin (including both neat PS resin and that from the carbon black concentrate). Heat the polymer melt to 200° C. and inject 4.8 pph $CO_2$. Cool the polymer melt to 125° C. and extrude through a slit die 50 mm wide having a gap of about 1 mm to produce Comp Ex D.

Prepare Comp Ex E, F, and G with the same formulation, processing equipment, and conditions as for Comp Ex D, but replace a portion of the $CO_2$ with HFC-134a. Table 7 shows the concentrations of $CO_2$ and HFC-134a for Comp Ex D-G.

EX 17–19

Prepare Ex 17–19 with the same formulation, processing equipment, and conditions as for Comp Ex D, replacing a portion of the $CO_2$ with HFC-365mfc at the same molar levels as the HFC-134a in Comp Ex E, F, and G. Table 7 contains relative concentrations of blowing agent components.

Comparing Comp Ex E-G with Comp Ex D, reveals little change in any foam properties as HFC-134a replaces $CO_2$. In contrast, a comparison of Ex 17–19 with Comp Ex D, or with Comp Ex E - G, reveals that the average open cell percent decreases dramatically with use of HFC-365mfc. Lambda values are also lower in Ex 17–19 than in Comp Ex E-G.

TABLE 7

| Component/Property | Units | Comp Ex D | Comp Ex E | Comp Ex F | Comp Ex G | Ex 17 | Ex 18 | Ex 19 |
|---|---|---|---|---|---|---|---|---|
| $CO_2$ | wt % of total blowing agent | 100 | 75 | 59 | 42 | 67 | 50 | 33 |
| HFC-134 a | wt % of total blowing agent | 0 | 25 | 41 | 58 | 0 | 0 | 0 |
| HFC-134 a | mole fraction of total blowing agent | 0 | 0.13 | 0.23 | 0.37 | 0 | 0 | 0 |
| HFC-365 mfc | wt % of total blowing agent | 0 | 0.0 | 0.0 | 0.0 | 33 | 50 | 67 |
| HFC-365 mfc | mole fraction of total blowing agent | 0 | 0 | 0 | 0 | 0.13 | 0.23 | 0.37 |
| Total Bowing Agent | pph | 4.8 | 5.6 | 6.3 | 7.1 | 6.3 | 7.4 | 9.0 |
| Total Moles of Blowing Agent | mol/100 g Ps | 0.11 | 0.11 | 0.11 | 0.11 | 0.11 | 0.11 | 0.11 |
| Foam Density | kg/m³ | 42.5 | 42.8 | 43.6 | 42.9 | 43.3 | 42.6 | 42.9 |
| Average cell size | mm | 0.15 | 0.14 | 0.14 | 0.14 | 0.13 | 0.13 | 0.14 |
| Average Open Cell | % | 50.2 | 40.4 | 21.9 | 51.8 | 6.0 | 11.7 | 6.7 |
| 29 day lambda | mW/m·K (AT 10° C.) | 32.0 | 31.3 | 30.9 | 31.9 | 30.4 | 30.4 | 27.0 |

Ex 17–19 illustrate that a liquid HFC facilitates incorporation carbon black into a thermoplastic foam using a $CO_2$ blowing agent while achieving a lower open cell content and a lower thermal conductivity than when using a blowing agent containing $CO_2$ alone or with HFC-134a.

One may expect results similar to those of Ex 1–19 for other blowing agent compositions and polymer resins disclosed herein.

What is claimed is:
1. A blowing agent composition comprising:
   (a) liquefied carbon dioxide; and
   (b) at least one hydrofluorocarbon having a boiling point of greater than 30° C. and lower than about 120° C.;

said composition being essentially free of low-boiling ethers and low-boiling hydrocarbons other than (b).

2. The blowing agent composition of claim 1 wherein the hydrofluorocarbon is 1,1,1,3,3-pentafluorobutane.

3. The blowing agent composition of claim 2, wherein the hydrofluorocarbon concentration is 30 wt % or more and 70 wt % or less based on blowing agent composition weight.

4. The blowing agent composition of claim 1, further comprising at least one additional blowing agent selected from water and alcohols having a boiling point lower than about 120° C. at one atmosphere pressure.

5. A blowing agent composition comprising:
  (a) liquefied carbon dioxide; and
  (b) at least one hydrofluorocarbon having a boiling point of 14° C. or higher and lower than about 120° C.;
wherein greater than 50 weight-percent of the composition is carbon dioxide and wherein a sufficient amount of (b) is present to produce a polymeric foam having an improved skin quality, lower open cell content (according to ASTM method D-6226), larger average cell size, or any combination thereof relative to the same foam prepared using only carbon dioxide as a blowing agent.

6. The blowing agent composition of claim 5, further comprising at least one hydrofluorocarbon having a oiling point lower than 14° C.

7. The blowing agent composition of claim 5, wherein said blowing agent composition comprises only one hydrofluorocarbon.

8. The blowing agent composition of claim 5, further comprising at least one additional blowing agent selected from water and alcohols having a boiling point lower than about 120° C.

9. The blowing agent composition of claim 5, that is essentially free of alcohol.

10. The blowing agent composition of claim 5, further comprising:

(c) at least one hydrofluorocarbon having a boiling point lower than 14° C.; and
  (d) at least one additional blowing agent selected from water, alcohols, ketones, and aldehydes; said alcohols, ketones and aldehydes having a boiling point lower than about 120° C.

11. The blowing agent composition of claim 10, wherein (b) is 1,1,1,3,3-pentaflurobutane; (c) is 1,1,1,2-tetrafluoroethane or 1,1,1,2,3,3,3-heptafluoropropane; and (d) is ethanol.

12. A blowing agent composition consisting essentially of liquefied carbon dioxide and one hydrofluorocarbon having a boiling point of 14° C. or higher and lower than about 120° C.

* * * * *